United States Patent
Douaihy et al.

[15] 3,636,445
[45] Jan. 18, 1972

[54] NONREPETITIVE WAVEFORM PARAMETER MEASUREMENT

[72] Inventors: Sarkis Douaihy, Riverside; John F. Renz, Cinnaminson; William R. Blatchley, Delran; Terry W. Stahl, Cinnaminson, all of N.J.

[73] Assignee: Computer Test Corporation, Cherry Hill, N.J.

[22] Filed: Apr. 3, 1969

[21] Appl. No.: 813,078

[52] U.S. Cl. .......................................................324/77 R
[51] Int. Cl. ..........................................................G01r 23/16
[58] Field of Search.......................................................324/77

[56] References Cited

UNITED STATES PATENTS 3,452,278   6/1969   Myers et al. ..............................324/77

*Primary Examiner*—Edward E. Kubasiewicz
*Attorney*—Maleson, Kimmelman and Ratner

[57] ABSTRACT

Analyzing a nonrepetitive waveform by measuring the value of the peak amplitude $A_p$ of the waveform, the time duration $t_p$ between a predetermined time and the time that the peak amplitude occurs and the time duration $t_s$ between the predetermined time and the time that the peak amplitude has decreased to 10 percent of its peak value. The peak amplitude of the waveform is detected and delayed and the difference is derived between the delayed and undelayed peak signals to provide a zero crossing when the delayed peak signal reaches its peak and is equal to the undelayed peak signal. The zero crossing is detected and a command signal produced.

14 Claims, 6 Drawing Figures

INVENTORS.
SARKIS DOUAIHY
JOHN F. RENZ
BY
Maleson, Kimmelman & Ratner
ATTORNEYS.

3,636,445

NONREPETITIVE WAVEFORM PARAMETER MEASUREMENT

BACKGROUND OF THE INVENTION

1. Field of the Invention

This invention relates to the field of art of analysis of a nonrepetitive waveform.

2. Prior Art

A nonrepetitive waveform may be distinguished from waveforms which have a specific sequence or have an irregular but predictable sequence. Such nonrepetitive waveforms are produced for example in the output circuit of a magnetic memory element such as a ferrite toroidal core and these particular nonrepetititve waveforms are described in chapter 2, C. J. Quartly, Square-Loop Ferrite Circuitry, Prentice-Hall Inc., 1962. Analyzers are known which obtain from these nonrepetitive waveforms the relative measurement of time and amplitude signals. However, such analyzers have been limited in obtaining explicit measurements of such time and amplitude signals.

SUMMARY OF THE INVENTION

A system and method for analyzing a nonrepetitive waveform by measuring the value of the peak amplitude $A_P$ of the waveform and the time duration $t_p$ between a predetermined time and the time that the peak amplitude occurs. The peak amplitude of the waveform is detected and a resultant peak signal is delayed by a predetermined delay time. The difference is derived between the peak signal that has not been delayed and the delayed peak signal.

A command signal is produced at the time the delayed peak signal reaches the peak amplitude of the undelayed peak signal. In this manner the time interval between the command signal and the predetermined time is equal to $t_p$ plus the predetermined delay time. Further, the waveform itself is delayed by the predetermined delay time. This delayed waveform is sampled at the time of the command signal for producing an $A_p$ analog signal.

Brief Description of the Drawings

Referring now to FIG. 1 there is shown a single, square-loop ferrite toroidal memory core 10 to be tested or whose performance is to be evaluated. It will be understood that instead of a toroidal core 10, any magnetic memory element may be tested and evaluated. Any such memory element must be capable of two distinguishable states or electrical outputs. The test and evaluation may be performed on the basic memory element before the element is wired into a memory plane. In addition the test and evaluation may take place when the element is in a plane and may also take place when the planes are grouped and electrically stacked. However, the fundamental testing method and evaluation of performance is identical whether a particular element under test is loose or is wired in a plane or stack.

Figure 1:
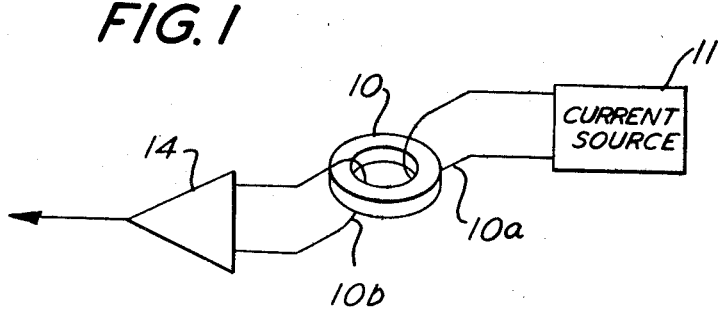
FIG. 1 illustrates in simplified form a current pulse being applied to and an output derived from a magnetic memory core.
Figure 2:
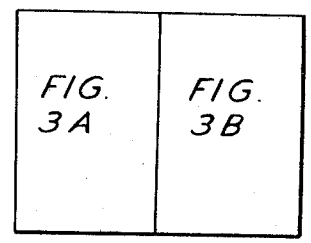
FIG. 2 illustrates how FIGS. 3A–B may be taken together.
Figure 4A:
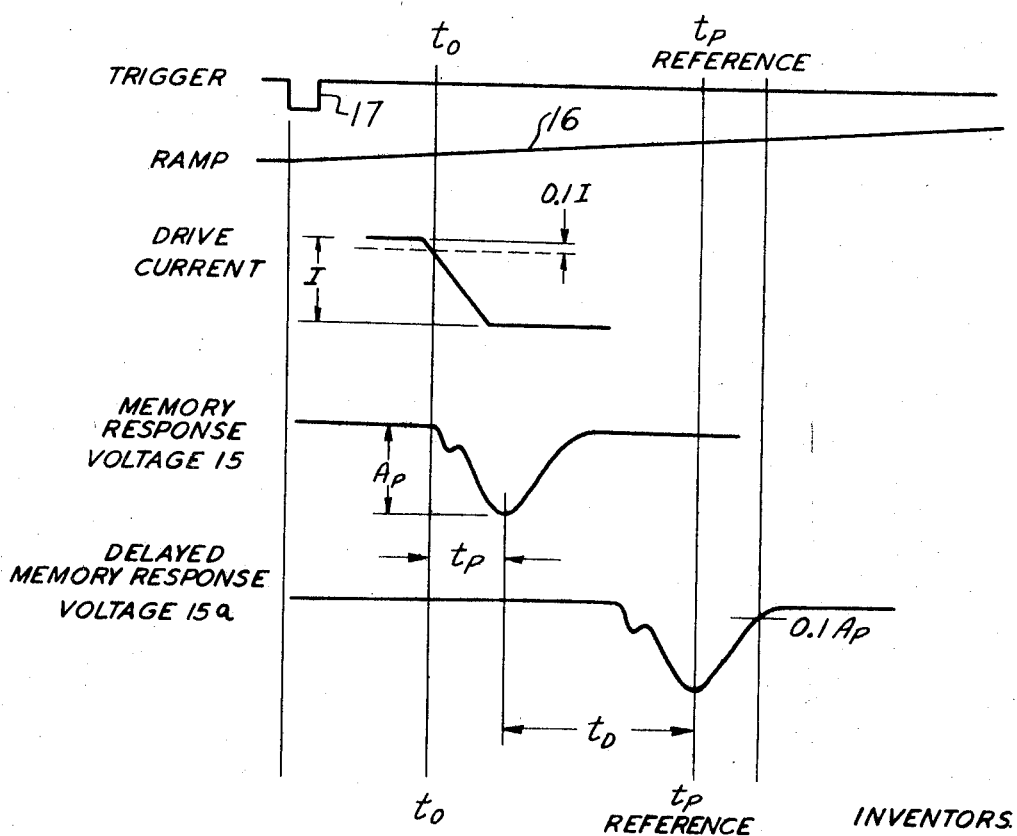
FIGS. 4A–B illustrate waveforms helpful in understanding FIGS. 1 and 3A–B.
Figure 4B:
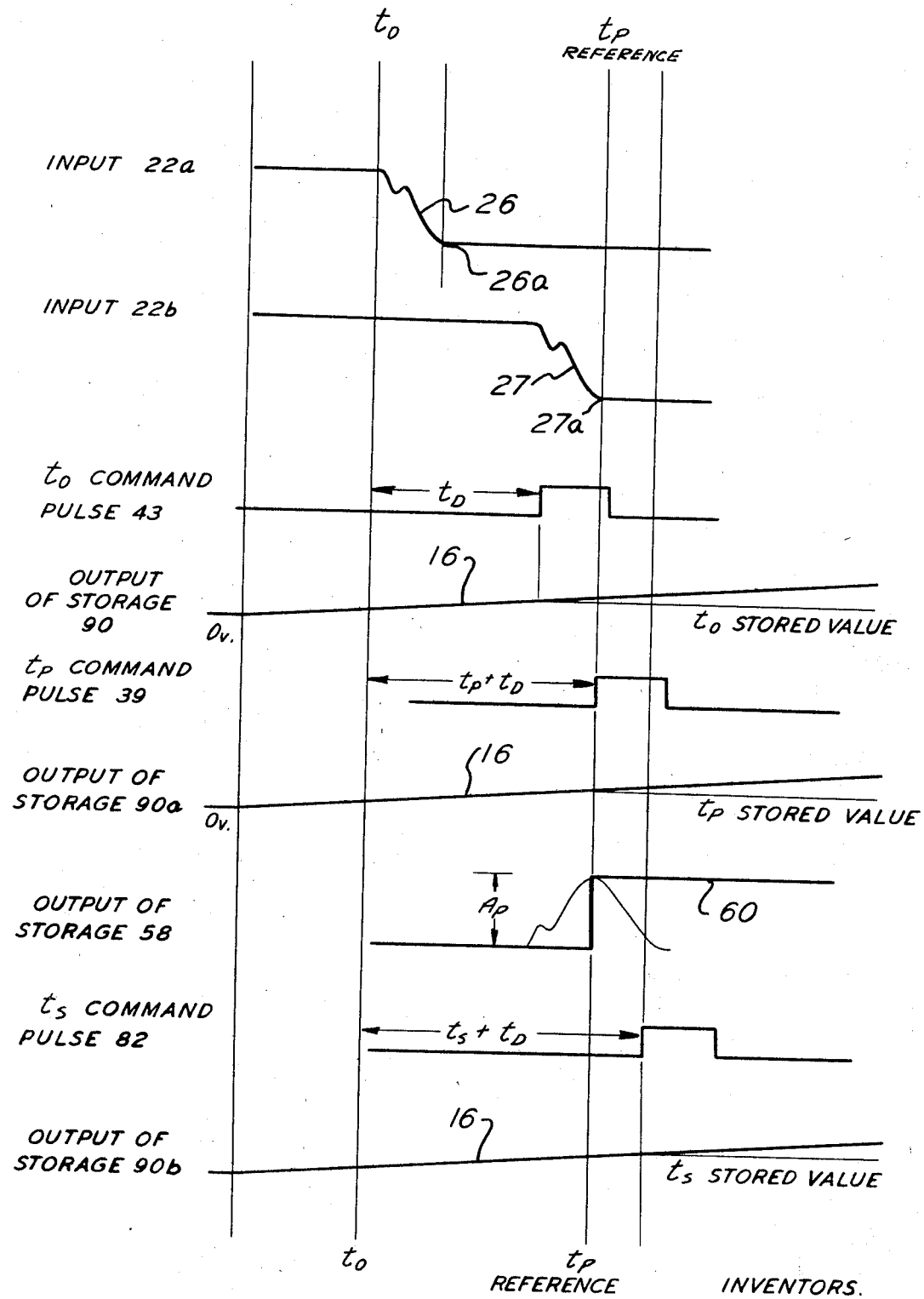

Specifically referring to FIG. 1, a drive current pulse 12 as shown in FIGS. 4A–B is produced by a current source 11 and is applied to winding 10a of core 10. An output voltage pulse which may be defined as a memory response voltage characteristic 15 is produced at winding 10b of core 10 and is applied to a sense amplifier 14. Accordingly, a test method may involve driving core 10 to a known magnetic state and then measuring response voltage characteristic 15 as applied to sense amplifier 14 during a read operation for example.

The parameters of response characteristic 15 to be measured may be defined as follows with respect to $t_0$:

$A_P$ = the value of the peak voltage of characteristic 15.

$t_p$ = the time duration between (1) time $t_0$ which occurs at 10 percent of the maximum value I of drive current pulse 12 and (2) the time that the peak voltage of characteristic 15 occurs.

$t_s$ = is the time duration between (1) time $t_0$ and (2) the time that characteristic 15 has decreased in an absolute direction to 10 percent of its peak value $A_p$.

It will be understood that $t_p$ and $t_s$ may be measured with respect to another predetermined time such as the leading edge of trigger pulse 17.

Figure 3A:
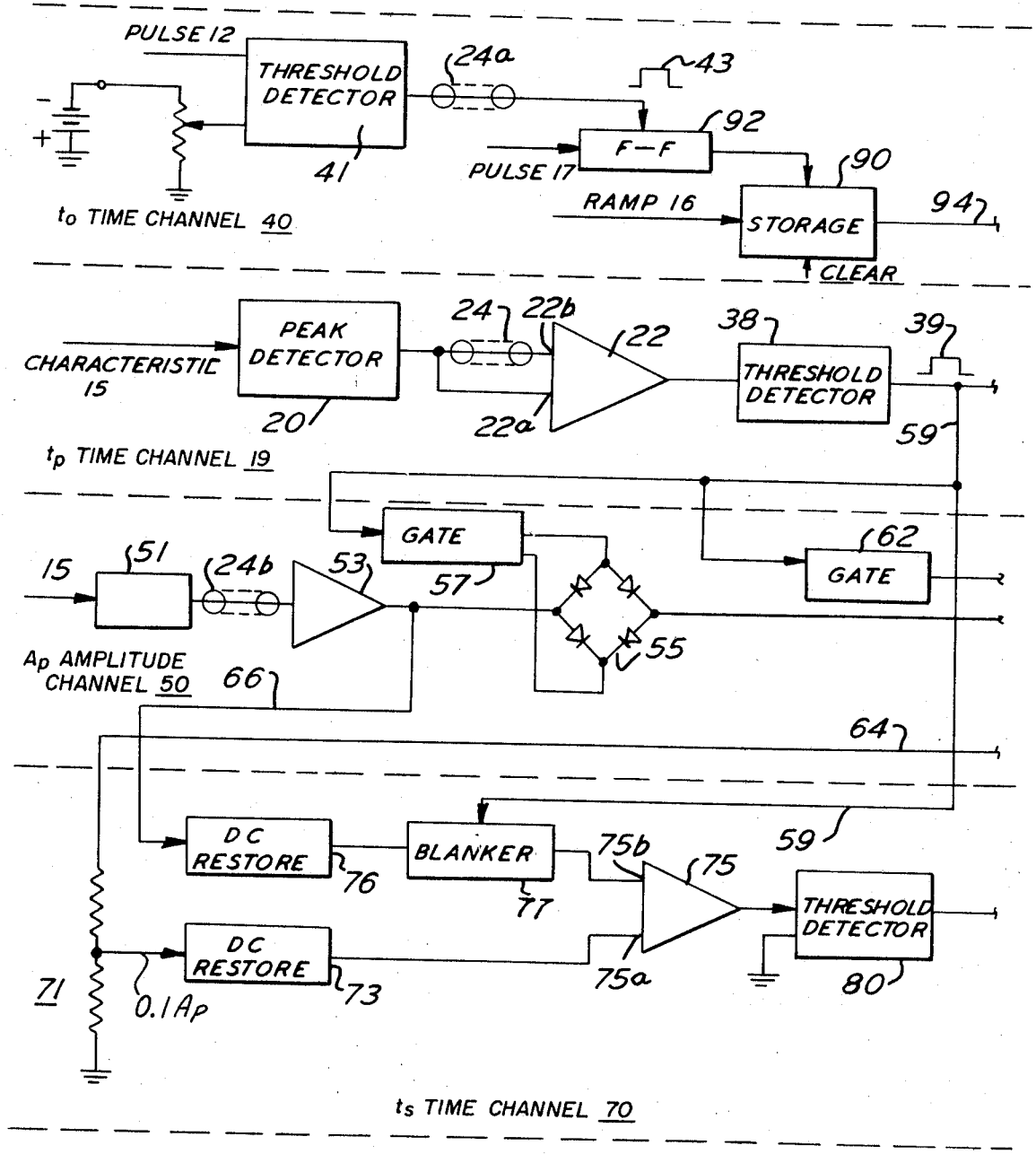
FIGS. 3A–B illustrate in block diagram form a waveform analysis and measurement system of the present invention.
Figure 3B:
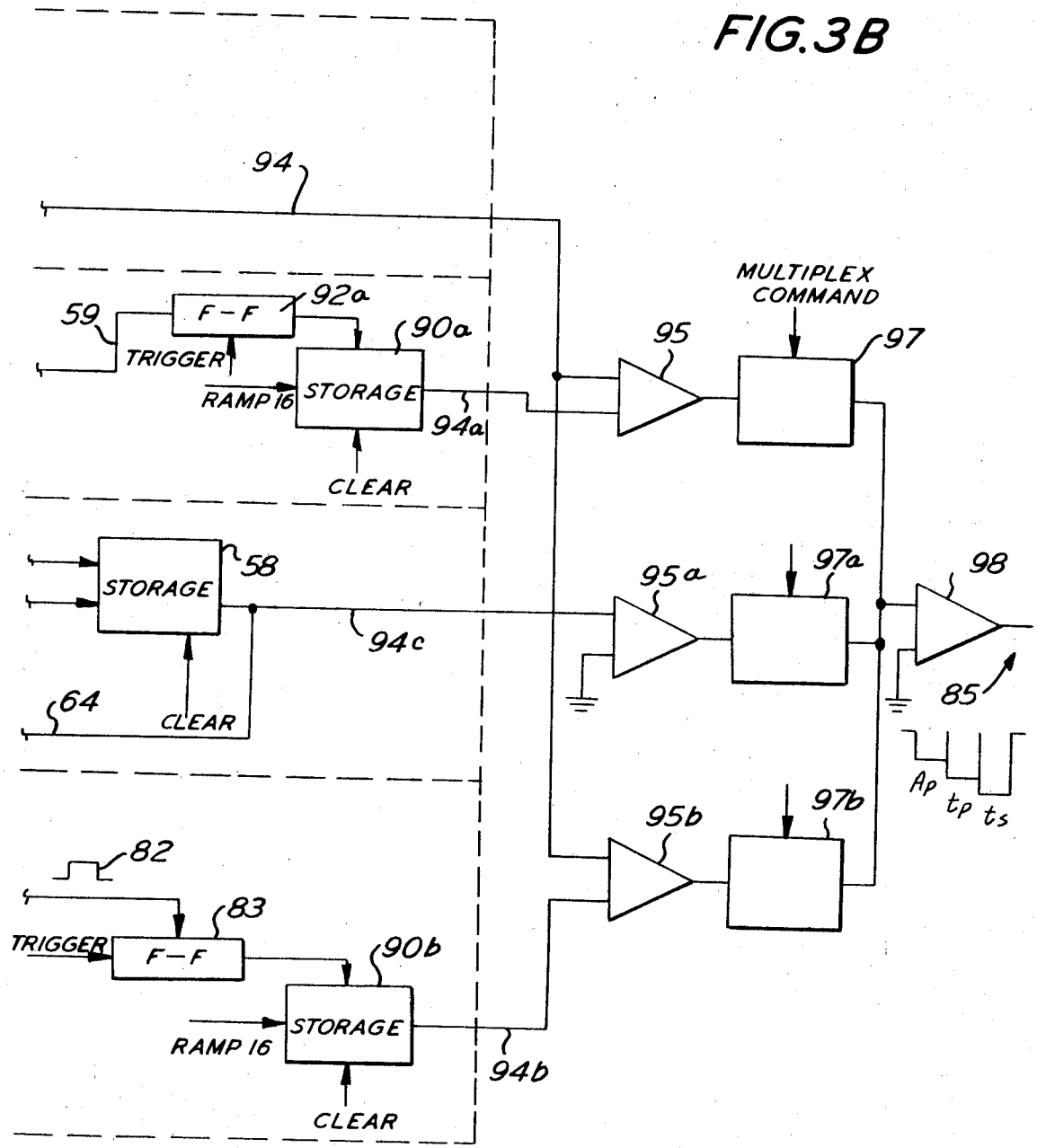

In accordance with the invention the foregoing three parameters $A_p$, $t_p$ and $t_s$ are measured on a one-shot or nonrepetitive basis by a waveform analysis and measurement system 100 shown in FIGS. 3A–B. $t_p$ is measured by first applying voltage characteristic 15 to a peak amplitude detector 20 of a $t_p$ time channel 19. Peak detector 20 comprises a low-value shunt capacitor as shown in R. Littauer: "Pulse Electronics," page 109, McGraw-Hill Book Co., 1965, and is effective to rectify voltage characteristic 15. The shunt capacitor is continually charged by characteristic 15 until the peak amplitude is achieved. The resultant output is directly applied to an input 22a of a differential amplifier 22. In addition the same output of detector 20 is also applied by way of a time delay network or cable 24 to input 22b of differential amplifier 22. In this manner the inputs to amplifier 22 are the identical detected signals though one is delayed with respect to the other.

The voltage characteristic applied to terminal 22a is shown in FIG. 4A–B as waveform 26 having a peak value 26a which is reached at the same time characteristic 15 reaches a peak voltage. Similarly, the voltage characteristic applied to terminal 22b is shown by characteristic 27 having a peak value 27a which is reached at the same time delayed characteristic 15a reaches a peak voltage and is equal to voltage value 26a. Waveforms 26 and 27 taken as absolute values are algebraically subtracted by differential amplifier 22 to produce a resultant absolute waveform which is applied to a threshold detector 38. The resultant waveform from amplifier 22 crosses ground threshold at the time when waveform 27 reaches its peak value 27a which is equal to peak value 26a of waveform 26. A threshold detector in which a determination is made of the moment at which a signal crosses ground or a reference is described in Millman and Taub: "Pulse, Digital and Switching Waveforms," page 255 and page 253 containing FIG. 7–23, McGraw-Hill Book Co., 1965. Accordingly, the leading edge of a rectangular output pulse 39 ($t_D$ command signal) from a threshold detector 38 indicates the time of $t_p$ reference. It will now be understood that $t_p$ reference occurs at a time equal to $t_p+t_D$ where $t_D$ is a subtractable constant value.

The generation of a $t_0$ command pulse 43 will now be described. Current pulse 12 produced by source 11 is applied to a threshold detector 41 of $t_0$ time channel 40. The other input to detector 41 is a DC reference potential which is adjustable to a DC value equal to 10 percent of the maximum value I of drive current pulse 12. Accordingly, detector 41 produces a rectangular output pulse at time $t_0$ when current pulse 12 passes the 10 percent threshold. The $t_0$ pulse is delayed in time by a time delay network 24a having a delay time $t_D$ equal to that of delay network 24 of channel 19. The resultant pulse 43, FIGS. 4A–B will be used for all subsequent time measurements.

In accordance with the invention the time difference between the leading edges of command pulses 43 and 39 is exactly equal to the time value of $t_p$. This may be understood when it is considered that the leading edge of pulse 39 occurs at time $t_p+t_D$ while the leading edge of pulse 43 occurs at a time duration $t_D$ after time $t_0$. Thus, the leading edge of command pulse 43 effectively indicates time $t_0$ for the remaining command pulses 39 and 82 and $A_p$ analog signal 60.

In order to determine the value of $A_P$, voltage characteristic 15 is applied to an $A_p$ amplitude channel 60. Specifically, characteristic 15 is applied to a buffer 51 the output of which is delayed by delay line 24b. Line 24b provides a delay time $t_D$ exactly equal to the delay times of lines 24 and 24a. Delayed characteristic 15a FIG. 4, is applied by way of an amplifier 53 to an input of a high-speed sampling bridge 55 which is controlled by a strobe gate or generator 57. Gate 57 is actuated to sample delayed characteristic 15a by the leading edge of pulse 39 which is applied thereto by way of conductor 59. Accordingly, delayed characteristic 15a is strobed at the time of its peak voltage which occurs at time $t_p$ reference. Accordingly, the waveform at the output of bridge 55 is a direct proportion of $A_p$, the peak amplitude of characteristic 15. This $A_p$ analog signal is stored by an analog storage circuit 58 which is gated to store by a gate 62 also under the control of pulse 39. Thus, the leading edge of pulse 39 is effective to cause storage circuit 58 to store and hold the $A_p$ analog signal (waveform 60, FIG. 4) until later cleared.

$A_p$ analog signal 60 is applied by way of conductor 64 to a voltage divider network 71 of a $t_s$ time channel 70. Network 71 is effective to divide the $A_p$ analog signal by 10 to provide a 0.1 $A_p$ analog signal which is applied by way of a DC restorer 73 to one input 75a of a differential amplifier 75. The delayed voltage characteristic 15a is taken at the output of amplifier 53 and applied by way of a conductor 66, a DC restorer 76 and through a blanker 77 to amplifier input 75b. Pulse 39 is applied to blanker 77 to blank out undesired memory response characteristics and to only pass delayed characteristic 15a. When the signals applied to inputs 75a-b are exactly equal in value, the output of amplifier 75 crosses ground threshold which is detected by a threshold detector 80. Threshold detectors 80 and 41 are of the same construction as that of detector 38 previously described. This threshold crossing indicates that delayed characteristic 15a is equal to 0.1 $A_p$ and occurs at time $t_s+t_D$. Accordingly, the leading edge of $t_s$ command pulse 82 produced at the output of detector 80 occurs at time $t_s+t_D$.

In accordance with the invention the time difference between the leading edge of $t_D$ command pulse 43 and $t_s$ command pulse 82 is exactly equal to the time value of $t_s$. This may be understood on the basis that the leading edge of pulse 43 occurs at a time duration $t_D$ after time $t_0$ and the leading edge of pulse 82 occurs at time $t_s+t_D$ after time $t_0$.

It will now be understood how command pulses or signals 39, 43 and 82 have been generated as well as the $A_p$ analog signal. It will now be explained how these signals are used to generate a single multiplex output 85.

Prior to time $t_0$ and the beginning of drive current pulse 12 the leading edge of a trigger pulse 17 initiates a ramp voltage 16 having a known and constant $dv/dt$. The ramp voltage 16 is applied to each of analog storage circuits 90-90b each of which is similar to circuit 58 and may comprise a storage capacitor connected to a switching field effect transistor. Circuit 90 is used in channel 40 and $t_0$ command pulse 43 is applied by way of a bistable network 92 to circuit 90. Bistable circuit 92 has previously been enabled by the occurrence of trigger pulse 17. Thus, pulse 43 is effective to switch circuit 92 to cause storage circuit 90 to store the value of ramp voltage 16 occurring at the time of the leading edge of pulse 43. The value of ramp voltage as stored by circuit 90 is indicated in FIGS. 4A-B as $t_0$ stored value of analog signal. In this manner there is produced an analog signal having a value proportional to the delay time by the predetermined proportionality constant of ramp 16.

In similar manner $t_p$ command pulse 39 is applied to a bistable circuit 92a. Circuit 92a has been enabled by trigger signal 17 so that storage circuit 90a stores that value of ramp voltage occurring at the time of the leading edge of pulse 39. In this manner storage circuit 90a stores a value of ramp voltage indicated as $t_p$ stored value. Similarly $t_s$ command pulse 82 is applied by way of enabled bistable circuit 83 to analog storage circuit 90b. In this manner circuit 90b stores that value of ramp voltage occurring at the time of the leading edge of pulse 82 which is indicated as $t_s$ stored value.

The $t_0$ and $t_p$ values stored by circuits 90 and 90a respectively are applied by way of conductors 94 and 94a respectively to inputs of a differential amplifier 95. Accordingly, amplifier 95 produces an output signal equal to $k(t_p-t_0)$ which is proportional to the value of $t_p$. Similarly the $t_0$ and $t_s$ stored values from storage circuits 90 and 90b respectively are applied by way of conductors 94 and 94b to differential amplifier 95b. Accordingly, amplifier 95b produces an output signal equal to $k(t_s-t_0)$ which is proportional to the value of $t_s$. Further the output of analog storage circuit 58 is applied by way of a conductor 94c to one input of differential amplifier 95a the other input of which is grounded. In this manner $A_p$ analog signal 60 provides at the output of amplifier 95a a signal equal to $k(A_p)$ which is proportional to $A_p$. If amplifiers 95-95b are identical amplifiers the outputs of these amplifiers may be multiplexed to provide a single multiplex output 85 with the order of multiplexing being as follows: amplifier 95a, 95 and 95b.

In the multiplexing operation the outputs of amplifiers 95-95b are applied by way of multiplex circuits 97-97b to one input of a differential amplifier 98. The other input of amplifier 98 is grounded. Circuits 97-97b each include a field effect transistor switching circuit and external multiplex command signals are applied to actuate the switching circuits. Specifically, command signals are applied in sequence to circuits 97a, 97 and then 97b to produce the multiplex output 85.

What is claimed is:

1. A system for analyzing a nonrepetitive waveform by measuring the value of the peak amplitude $A_p$ of said waveform and the time duration $t_p$ between a predetermined time and the time that said peak amplitude occurs comprising
    means for detecting said peak amplitude of said waveform and producing a peak signal at a detector output,
    first delay means for delaying said peak signal by a predetermined delay time,
    difference means connected to said first delay means and said detector output for deriving the difference between the delayed peak signal and the undelayed peak signal produced at said detector output,
    means connected to the output of said difference means to provide a first command signal at the time said delayed peak signal reaches the peak amplitude of said undelayed peak signal whereby the time interval between said first command signal and said predetermined time is equal to $t_p$ plus said predetermined delay time,
    second delay means for delaying said waveforms by said predetermined delay time to provide a delayed waveform, and
    means responsive to said first command signal for sampling said delayed waveform at the time of said first command signal for producing an analog signal proportional to $A_p$.

2. The system of claim 1 in which there is provided means for dividing by 10 said $A_p$ signal, and
    additional difference means for deriving the difference between said divided $A_p$ signal and said delayed waveform to produce a second command signal at the time the delayed waveform has decreased in an absolute direction to 10 percent of its peak value whereby the time duration of said second command signal with respect to said predetermined time is equal to the time duration $t_s$ between the time of occurrence of said 10 percent peak value with respect to said predetermined time plus said predetermined delay time.

3. The system of claim 2 in which there is provided means for producing a time signal at said predetermined time, third delay means for delaying said time signal by said predetermined delay time, means including a storage circuit for producing a first analog stored signal having a value proportional to said predetermined delay time by a predetermined proportionality constant.

4. The system of claim 3 in which there is provided first storage means coupled to said difference means connected to said first delay means for producing a second analog stored signal proportional to by said proportionality constant the time interval between said first command signal and said predetermined time.

5. The system of claim 4 in which there is provided second storage means connected to said additional difference means for providing a third analog stored signal proportional to by said proportionality constant the time interval between said second command signal and said predetermined time.

6. The system of claim 5 in which there is provided first differential means for deriving the difference between said first and second analog signals to produce a signal proportional to the value of $t_p$.

7. The system of claim 6 in which there is provided second differential means for deriving the difference between said first and third analog signals to produce a signal proportional to the value of $t_s$.

8. The system of claim 1 in which said difference means includes a differential amplifier for deriving the difference between said delay peak signal and said undelayed peak signal whereby as said delayed peak signal reaches its peak amplitude the output of said amplifier decreases in an absolute direction until zero, a zero threshold detector for producing said first command signal when the difference between said delayed and undelayed peak signals reaches zero.

9. The system of claim 7 in which there is provided multiplexing means for connecting to said first and second differential means and to said sampling means for producing at an output in a predetermined sequence said $A_p$, $t_p$ and $t_s$ signals.

10. A system for analyzing a nonrepetitive waveform produced in the output circuit of a magnetic memory element by measuring the value of the peak amplitude of said waveform, the time interval $t_p$ between a predetermined time and the time that said peak amplitude occurs and the time interval $t_s$ between said predetermined time and the time that said peak amplitude has decreased in an absolute direction to 10 percent of said peak value comprising means for detecting said peak amplitude of said waveform and producing a peak signal at a detector output, first delay means connected to said detector output for delaying said peak signal by a predetermined delay time, first difference means connected to said first delay means and said detector output for deriving the algebraic difference between the delayed peak signal and the undelayed peak signal produced at said detector output, means connected to the output of said first difference means to provide a first command signal produced at the time said delayed peak signal reaches the peak amplitude of said undelayed peak signal whereby the time interval between the occurrence of said first command signal and said predetermined time is equal to $t_p$ plus said predetermined delay time, second delay means for delaying said waveform by said predetermined delay time, means responsive to said first command signal for sampling said delayed waveform at the time of said first command signal for producing an analog signal proportional to $A_p$, and means for dividing by 10 said $A_p$ signal, second difference means for deriving the difference between said 10 percent $A_p$ signal and said delayed waveform to produce a second command signal at the time said delayed waveform has decreased in an absolute direction to said 10 percent peak value.

11. The system of claim 10 in which detecting means includes a peak detector circuit having charging means which is continually charged by said waveform until said peak amplitude is reached thereby to provide a substantially constant peak signal at said detector output.

12. The system of claim 10 in which there is provided means for producing a time signal at said predetermined time, third delay means for delaying said time signal by said predetermined delay time, means for producing a first analog signal having a value proportional to said predetermined time delay by a predetermined proportionally constant.

13. The system of claim 12 in which there is provided first storage means connected to said first difference means for producing a second analog signal proportional to by said proportionality constant the time duration of said first command signal with respect to said predetermined time.

14. A method for analyzing a nonrepetitive waveform by measuring the value of the peak amplitude $A_p$ of said waveform and the time duration $t_p$ between a predetermined time and the time that said peak amplitude occurs which comprises the steps of detecting the peak amplitude of the waveform and producing a peak signal, delaying the peak signal by a predetermined delay time, deriving the difference between the delayed peak signal and the peak signal that has not been delayed, producing a signal which crosses a threshold when the delayed peak signal reaches the peak amplitude of the undelayed peak signal, detecting the threshold and producing a command signal, delaying the waveform by said predetermined delay time, and sampling the delayed waveform at the time of the command signal and producing an analog signal proportional to $A_p$.

* * * * *